US008428189B2

United States Patent
Suzuki et al.

(10) Patent No.: US 8,428,189 B2
(45) Date of Patent: Apr. 23, 2013

(54) MOBILE COMMUNICATION TERMINAL AND CONTROL METHOD THEREFOR

(75) Inventors: Hidetoshi Suzuki, Yokohama (JP); Takashi Okada, Yokohama (JP); Shinsuke Ogawa, Yokohama (JP); Shinya Oka, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 370 days.

(21) Appl. No.: 12/707,189

(22) Filed: Feb. 17, 2010

(65) Prior Publication Data

US 2010/0208784 A1 Aug. 19, 2010

(30) Foreign Application Priority Data

Feb. 18, 2009 (JP) ................. 2009-035760

(51) Int. Cl.
*H03K 9/00* (2006.01)
*H04L 27/06* (2006.01)
*H04L 1/02* (2006.01)

(52) U.S. Cl.
USPC ............ 375/316; 375/340; 375/347; 375/219

(58) Field of Classification Search .................. 375/211, 375/219, 240, 240.02, 295, 316, 324, 339, 375/338, 340, 347, 369, 362; 370/310, 316, 370/318, 311, 210, 338, 349, 328
See application file for complete search history.

(56) References Cited

U.S. PATENT DOCUMENTS

| 2004/0254980 | A1 | 12/2004 | Motegi et al. | |
|---|---|---|---|---|
| 2007/0064839 | A1* | 3/2007 | Luu ............................. | 375/340 |
| 2007/0242600 | A1* | 10/2007 | Li et al. ......................... | 370/210 |
| 2008/0212539 | A1* | 9/2008 | Bottomley et al. ........... | 370/335 |
| 2009/0129304 | A1* | 5/2009 | Kim et al. ..................... | 370/311 |

FOREIGN PATENT DOCUMENTS

JP 2004-172982 6/2004

(Continued)

OTHER PUBLICATIONS

"3$^{rd}$ Generation Partnership Project; Technical Specification Group Radio Access Network; Evolved Universal Terrestrial Radio Access (E-UTRA); User Equipment (UE) radio transmission and reception (Release 8)", 3Gpp Organizational Partners, 2008. pp. 1-91.

(Continued)

*Primary Examiner* — Sam K Ahn
*Assistant Examiner* — Linda Wong
(74) *Attorney, Agent, or Firm* — Oblon, Spivak, McClelland, Maier & Neustadt, L.L.P.

(57) ABSTRACT

A determiner determines whether or not a mobile communication terminal is in a standby mode. A fast Fourier transform calculator demodulates a signal which is received at the mobile communication terminal. A controller causes the fast Fourier transform calculator to vary at least one of a frequency range for fast Fourier transform or a number of frequency samples used by the fast Fourier transform calculator, depending on determination by the determiner. Preferably, the controller is adapted to cause the fast Fourier transform calculator to vary at least one of the frequency range for fast Fourier transform or the number of frequency samples used by the fast Fourier transform calculator based on information about frequencies used in communication from a radio base station to the mobile communication terminal and notified from the radio base station.

4 Claims, 2 Drawing Sheets

FOREIGN PATENT DOCUMENTS

| | | |
|---|---|---|
| JP | 2005-295238 | 10/2005 |
| JP | 2007-174353 | 7/2007 |
| JP | 2007-259326 | 10/2007 |
| JP | 2008-236154 | 10/2008 |
| JP | 2008-245139 A | 10/2008 |
| JP | 2008-546331 A | 12/2008 |
| JP | 2009-105722 | 5/2009 |
| WO | WO 03/105519 A1 | 12/2003 |
| WO | 2009/020109 A1 | 2/2009 |

OTHER PUBLICATIONS

Chinese Office Action issue Jun. 4, 2012 in CN Application No. 201010121151.4 with English translation.

Office Action issued Jul. 31, 2012 in Japanese Patent Application No. 2009-035760 (with English translation).

Decision of Rejection issued for JP Application No. 2009-035760, mailed on Oct. 9, 2012, filed on Feb. 18, 2009 (with English translation).

* cited by examiner

MOBILE COMMUNICATION TERMINAL AND CONTROL METHOD THEREFOR

BACKGROUND OF THE INVENTION

1. Field of the Invention

The present invention relates to mobile communication terminals and to control methods therefor.

2. Related Art

In recent years, OFDM (Orthogonal Frequency Division Multiplexing) has attracted attention as a radio communication method for mobile communication systems, as disclosed in, for example, Patent Documents 1 and 2 below. Compared with other communication methods (e.g., Time Division Multiplexing, Frequency Division Multiplexing, Code Division Multiplexing, etc.), OFDM has advantages such as higher efficiency of frequency utilization and higher resistance to multipath interference. OFDM is a carrier transmission method in which a single frequency band is divided into multiple subcarriers that are orthogonal to each other, and in which data is transmitted on each subcarrier. Generally, in OFDM, a received signal is demodulated using FFT (fast Fourier transform). Since FFT requires an enormous amount of computing, power consumption for FFT is also enormous.

In a mobile communication system such as a cellular phone system, it is important to minimize power consumption in a mobile communication terminal. This is because the battery will be drained more rapidly and the battery standby time will be shorter if power is wasted. As a result, the terminal must include a larger battery to provide sufficient battery standby time.

In order to reduce the power use of a mobile communication terminal, there have been proposed techniques in which the electricity supply is suspended when the terminal is not in communication. For instance, Patent Document 3 below discloses a technique in which power is switched on and off depending on the status of the terminal. This technique enables the terminal to reduce power use by determining time periods in which the terminal will not communicate and by stopping the electricity supply during the determined time periods.

Patent Document 1: JP-A-2008-236154
Patent Document 2: JP-A-2007-174353
Patent Document 3: JP-A-2004-172982

Mobile communication terminals have been steadily reduced in size and weight. Thus, there is a problem with convenience of use if a large battery is used to provide long battery standby times or if multiple batteries must be carried. In order to ensure convenience of use, the size of the battery is preferably reduced by reducing the consumption of power for FFT.

In the above-described technique, the electricity supply is stopped when the terminal is not communicating. The mobile communication terminal used with the technique connects to a base station periodically to determine whether or not there is an incoming call. However, since the electricity supply is suspended when the terminal is not communicating with the base station, the terminal requires time for reactivation and cannot respond immediately to the base station when the base station accesses the terminal.

SUMMARY OF THE INVENTION

Accordingly, the present invention provides a mobile communication terminal that can minimize power use while at the same time providing rapid response to a base station.

In accordance with an aspect of the present invention, a mobile communication terminal includes: a determiner for determining whether or not the mobile communication terminal is in a standby mode; a fast Fourier transform calculator for demodulating a signal that is received at the mobile communication terminal; and a controller for causing the fast Fourier transform calculator to vary at least one of a frequency range for fast Fourier transform or a number of frequency samples used by the fast Fourier transform calculator, depending on determination by the determiner.

For using the mobile communication terminal, since the mobile communication terminal continues the receiving operation during the standby mode, the rapid response to the base station is ensured. Moreover, at least one of the frequency range for FFT or the number of frequency samples for FFT used to demodulate the received signal is varied when the mobile communication terminal is determined to be in the standby mode. Therefore, the amount of computing for the FFT is reduced, and thus, the throughput and the number of times FFT must be executed are reduced. As a result, the power use during the standby mode is reduced, and therefore the battery life can be increased.

In a preferred embodiment, the controller may be adapted to cause the fast Fourier transform calculator to vary at least one of the frequency range for fast Fourier transform or the number of frequency samples used by the fast Fourier transform calculator based on information about frequencies used in communication from a radio base station to the mobile communication terminal and notified from the radio base station.

For using the mobile communication terminal, at least one of the frequency range for FFT or the number of frequency samples for FFT is varied based on the information about frequencies used in communication from a radio base station to the mobile communication terminal and notified from the radio base station notified from the radio base station. Therefore, the amount of computing necessary for the FFT is reduced, and thus, the throughput and the processing frequency to execute FFT are reduced. As a result, the power use during the standby mode is reduced, and the battery life can be increased.

In accordance with an aspect of the present invention, a control method for a mobile communication terminal includes steps of: determining whether or not the mobile communication terminal is in a standby mode; executing fast Fourier transform to demodulate a signal which is received at the mobile communication terminal; and controlling to cause the step of executing fast Fourier transform to vary at least one of a frequency range for fast Fourier transform or a number of frequency samples used by the step of executing fast Fourier transform, depending on determination by the step of determining.

In a preferred embodiment, the step of controlling may cause the step of executing fast Fourier transform to vary at least one of the frequency range for fast Fourier transform or the number of frequency samples used by the step of executing fast Fourier transform based on information about frequencies used in communication from a radio base station to the mobile communication terminal and notified from the radio base station.

BRIEF DESCRIPTION OF THE DRAWINGS

With reference to the accompanying drawings, an embodiment according to the present invention will be described hereinafter. In the drawings.

DETAILED DESCRIPTION OF PREFERRED EMBODIMENTS

First, a configuration of a mobile communication terminal according to an embodiment of the present invention will be described.

Figure 1:
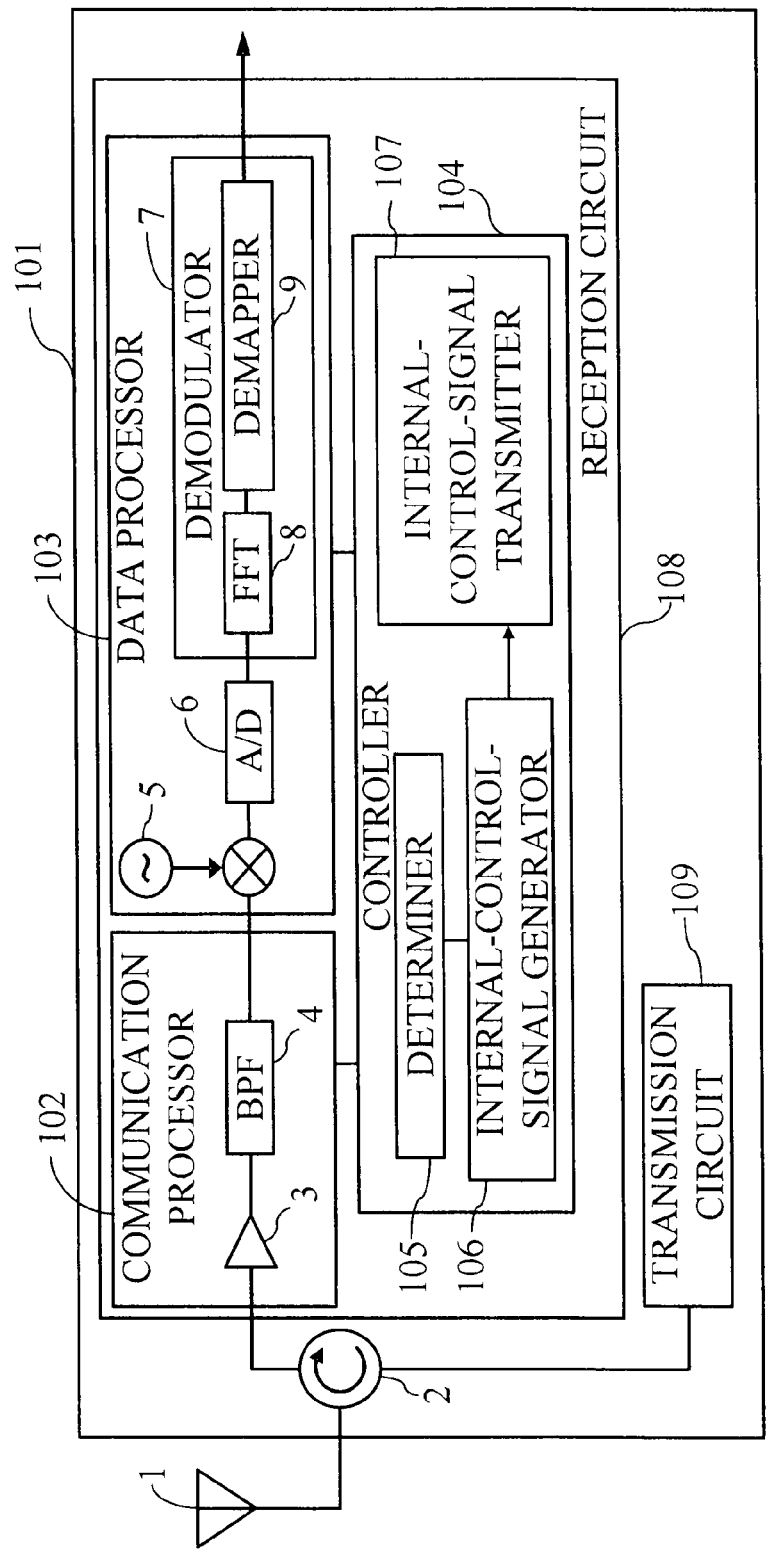
FIG. 1 is a schematic view showing a configuration of a mobile communication terminal according to an embodiment of the present invention.

FIG. 1 is a schematic view of a mobile communication terminal 101 according to the embodiment of the present invention. The mobile communication terminal 101 includes a transmitting and receiving antenna 1, a duplexer 2, a reception circuit 108, and a transmission circuit 109. The duplexer 2 is connected to the transmitting and receiving antenna 1, the reception circuit 108, and the transmission circuit 109. A signal, which is modulated using OFDM and is sent from a radio base station (hereinafter called OFDM modulated signal), is received at the transmitting and receiving antenna 1. Then, the received OFDM modulated signal is forwarded via the duplexer 2 to the reception circuit 108. There will be no further description of the transmission circuit 109 since the present invention relates to reception.

The OFDM modulated signal that is transmitted from a base station and is received by the mobile communication terminal 101 is modulated at multiple subcarriers (i.e., frequencies). The transmitted signals are classified broadly into a signal related to user data such as voice data, a subcarrier mapping information which represents allocation of subcarriers to receiving users, and terminal control signals for controlling the mobile communication terminal such as a synchronization signal. The terminal control signals are modulated at fixed subcarriers.

As shown in FIG. 1, the reception circuit 108 includes a communication processor 102, a data processor 103, and a controller 104. These elements are interconnected with one another. The communication processor 102 includes a low noise amplifier 3 and a bandpass filter 4. The data processor 103 includes an RF (Radio Frequency) synthesizer 5, an analog-to-digital converter 6, and a demodulator 7. The demodulator 7 includes a FFT (fast Fourier transform) calculator 8 and a demapper 9. The controller 104 includes a determiner 105, an internal-control-signal generator 106, and an internal-control-signal forwarder 107.

The internal elements of the controller 104 (i.e., the determiner 105, the internal-control-signal generator 106, and the internal-control-signal forwarder 107) are, e.g., implemented by a CPU (central processing unit) that executes a computer program. Although the controller 104 and the communication processor 102 are described as separated elements in the specification, the communication processor 102 may include such a CPU that executes the program for implementing the controller 104. Furthermore, although the controller 104 and the data processor 103 are described as separated elements in the specification, the CPU for the data processor 103, in particular, the CPU for the FFT calculator 8, may be identical to the CPU that executes the program for implementing the controller 104.

Next, an operation of the mobile communication terminal will be described in general.

The OFDM modulated signal which is received at the transmitting and receiving antenna 1 is forwarded to the communication processor 102 by the duplexer 2. The low noise amplifier 3 amplifies the forwarded signal. The bandpass filter 4 in the communication processor 102 removes frequencies other than desired frequencies from the amplified signal. The filtered signal is forwarded to the data processor 103.

The filtered signal which is forwarded to the data processor 103 is down-converted to a baseband signal by the RF synthesizer 5 in the data processor 103. The baseband signal is converted to a digital signal by the analog-to-digital converter 6. Then, the FFT calculator 8 in the demodulator 7 executes FFT to demodulate the converted digital signal into a demodulated received signal. The demodulated received signal is forwarded to the demapper 9. Based on the subcarrier mapping information, the demapper 9 extracts from the demodulated received signal information which is addressed to the mobile communication terminal 101 or information which is broadcasted. The above processes relating to reception are executed even in a standby mode in which the mobile communication terminal does not receive user data. The mobile communication terminal in the standby mode processes the terminal control signals only.

The above-described operations of the communication processor 102 and the data processor 103 are controlled by the controller 104.

Next, determination of a communication mode and control of a receiving operation, in particular, control of a frequency range and the number of frequency samples in the FFT calculation in this embodiment, will be described.

An outline of an operation of the controller 104 follows. The determiner 105 determines the communication mode of the mobile communication terminal 101. Based on the determined communication mode, the internal-control-signal generator 106 generates an internal control signal for controlling other elements, in particular, the FFT calculator 8. The generated internal control signal is forwarded to the elements to be controlled.

Figure 2:
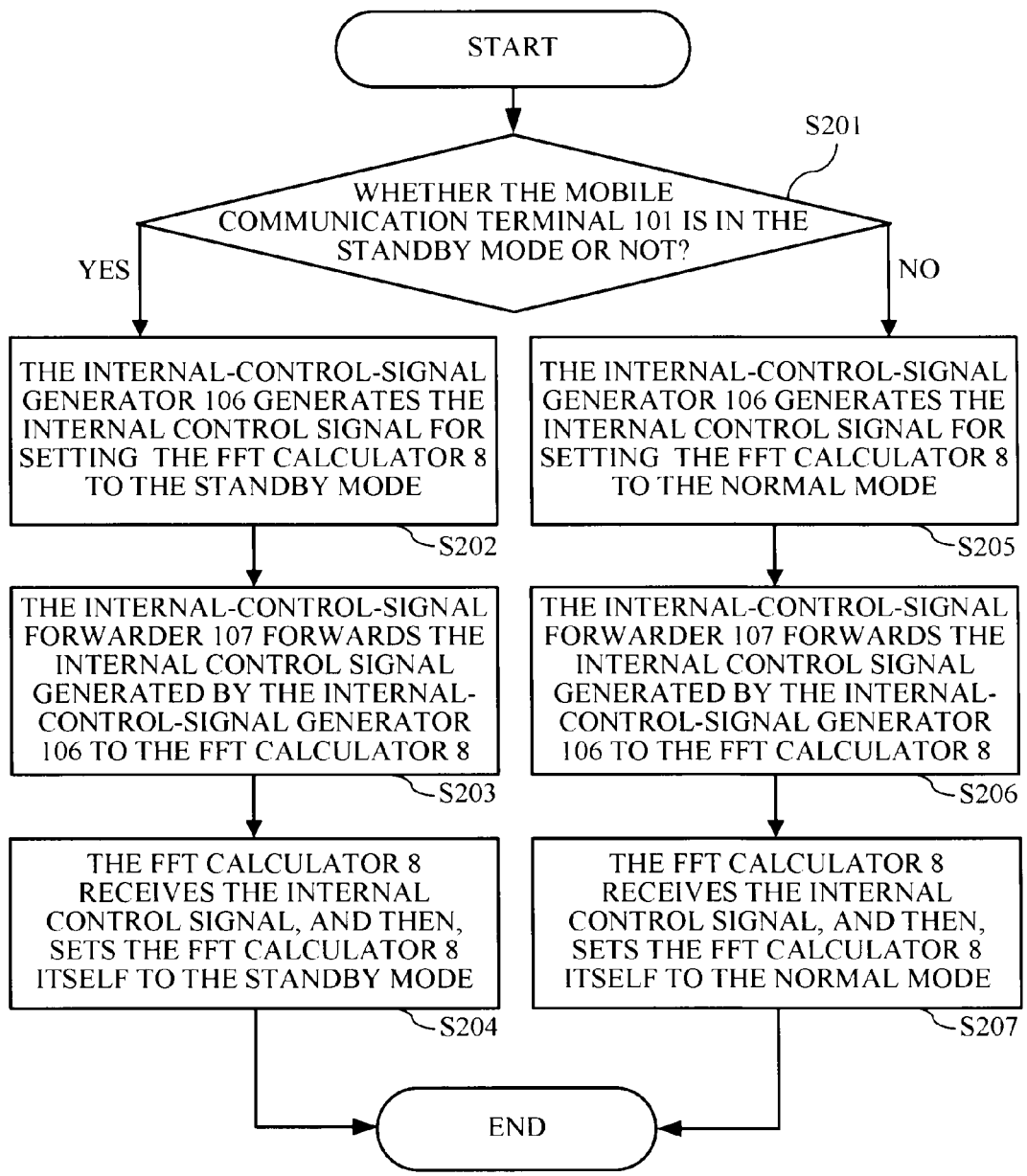
FIG. 2 is a flow chart showing an operation related to determination and control according to the embodiment of the present invention.

With reference to FIGS. 1 and 2, the operation related to the determination and the control will be described in detail hereinafter. FIG. 2 is a flowchart that illustrates the operation related to the determination and the control in the present invention. The controller 104 controls the FFT calculator 8. Additionally, the controller 104 may control other elements. This process flow may start regularly or at a random point in time. In addition or instead, this process flow may start at a point in time when a communication mode is changed to another communication mode. Consequently, this process flow is repeatable.

The determiner 105 in the controller 104 determines the communication mode of the mobile communication terminal 101, in particular, whether or not the mobile communication terminal 101 is in the standby mode, and forwards the communication mode information to the internal-control-signal generator 106 (S201).

The internal-control-signal generator 106 generates the internal control signal for controlling the operation of the FFT calculator 8 based on the mode information forwarded from the determiner 105 (S202 and S205). The internal-control-signal forwarder 107 forwards the internal control signal generated by the internal-control-signal generator 106 to the FFT calculator 8 (S203 and S206).

The internal control signal may include information related to the communication mode only. The internal control signal may further include a command to an element to be controlled.

For instance, the internal control signal may include only information that indicates the mobile communication terminal 101 is in the standby mode. The FFT calculator 8 which receives the internal control signal may reduce the frequency range for FFT based on the information that indicates the mobile communication terminal 101 is in the standby mode.

Alternatively, the internal control signal may include a command for setting the FFT calculator 8 to be in the standby mode. The FFT calculator 8 which receives the internal control signal may reduce the frequency range for FFT in accordance with the command included in the internal control signal.

For simplicity of description, an example in which the internal control signal includes the command will be described hereinafter. However, the present invention is not limited to this example.

The FFT calculator 8 receives the internal control signal which the internal-control-signal forwarder 107 has forwarded, and then varies the receiving operation mode in accordance with the command included in the internal control signal (S204 and S207).

The receiving operation mode includes a standby mode and a normal mode. However, the receiving operation mode is not limited to these two modes. For instance, in place of the normal mode, the receiving operation mode may include a voice communication mode, a video phone communication mode, and a data communication mode.

An operation of the FFT calculator 8 in the standby mode will be described.

As described above, the subcarriers used for the terminal control signals are fixed in the OFDM modulated signal of this embodiment. Accordingly, only the terminal control signals can be extracted by executing FFT in the frequency range limited to the subcarrier range for the terminal control signals and in a frequency range covering a possible Doppler frequency transition which is induced by the movement of the mobile communication terminal 101 and originated from the subcarrier range for the terminal control signals.

Thus, the FFT calculator 8 in the standby mode limits the frequency range for FFT to a predetermined range and limits the number of frequency samples (subcarrier samples) for FFT to a predetermined value within the predetermined frequency range, executes FFT, and extracts the terminal control signals. For instance, the FFT calculator 8 may limit the frequency range for FFT to one MHz and the number of frequency samples for FFT to 128.

As described above, the FFT calculator 8 in the standby mode limits both the frequency range for FFT and the number of frequency samples for FFT. However, the FFT calculator 8 may limit either the frequency range for FFT to a predetermined range or the number of frequency samples for FFT to a predetermined value.

An operation of the FFT calculator 8 in the normal mode will be described.

The FFT calculator 8 in the normal mode sets the frequency range for FFT and the number of frequency samples for FFT wider than those in the standby mode, i.e., sets the frequency range for FFT and the number of frequency samples for FFT which cover not only the terminal control signals but also the user data. For instance, the FFT calculator 8 sets the frequency range for FFT to 5 MHz and the number of frequency samples for FFT to 512.

As described above, the FFT calculator 8 in the normal mode sets both the frequency range for FFT and the number of frequency samples for FFT wider than those in the standby mode. However, the FFT calculator 8 may set either the frequency range for FFT or the number of frequency samples for FFT wider than that in the standby mode.

Furthermore, the controller 104 may produce the aforementioned command for causing the FFT calculator 8 to vary the frequency range for FFT and the number of frequency samples for FFT based on the information about subcarriers notified from the radio base station (i.e., the subcarrier mapping information). The subcarrier mapping information represents allocation of subcarriers to individual mobile communication terminals and to broadcast communications. Therefore, based on the subcarrier mapping information, the mobile communication terminal 101 can determine the subcarrier range (frequency range) to which FFT should be conducted, and can determine how many subcarriers are allocated to the signal to be processed by the mobile communication terminal 101 itself.

For instance, the controller 104 may utilize the subcarrier mapping information to produce the aforementioned command for controlling the FFT calculator 8 to limit the frequency range for FFT to the subcarrier range which is allocated to the signal to be processed by the mobile communication terminal 101. As a result, the FFT calculator 8 does not need to execute FFT at the subcarrier range that is allocated to the signals to be processed by other mobile communication terminals, so that the throughput of the FFT calculator 8 can be reduced.

The controller 104 may utilize the subcarrier mapping information to produce the aforementioned command for controlling the FFT calculator 8 to vary the number of frequency samples for FFT depending on the number of subcarriers allocated to the signal to be processed by the mobile communication terminal 101. As a result, the number of frequency samples for FFT is maintained appropriately, and thus, the throughput of the FFT calculator 8 can be reduced.

In the above embodiment, the subcarrier mapping information is utilized directly without any modification to control parameters for FFT. However, the subcarrier mapping information may be utilized indirectly with modification to control parameters for FFT. That is, secondary information may be generated based on the subcarrier mapping information, and then, either the frequency range for FFT or the number of frequency samples for FFT may be varied based on the generated secondary information.

In an example of varying the number of frequency samples for FFT, the number of frequency samples for FFT may be varied based on data traffic information which is estimated depending on the number of subcarriers which is notified from the base station and which is allocated to the signal to be processed by the mobile communication terminal 101.

As described above, the subcarrier mapping information is utilized directly or indirectly to vary either the subcarrier range for FFT or the number of frequency samples for FFT. However, the subcarrier mapping information may be utilized directly or indirectly to vary both the subcarrier range for FFT and the number of frequency samples for FFT.

In the above embodiment, since the mobile communication terminal continues the receiving operation during the standby mode, rapid responsiveness to the base station is ensured.

Moreover, at least one of the frequency range for FFT or the number of frequency samples for FFT used to demodulate the received signal is varied when the mobile communication terminal is determined to be in the standby mode. Therefore, the amount of computing necessary for FFT is reduced, and thus, the throughput and the number of times FFT must be executed are reduced. As a result, the power consumption in the standby mode is reduced, so that battery life can be increased.

Furthermore, at least one of the frequency range for FFT or the number of frequency samples for FFT is varied based on the information about subcarriers notified from the radio base station. Therefore, the amount of computing necessary for the FFT is reduced, and thus, the throughput and the processing frequency to execute FFT are reduced. As a result, the power consumption in the standby mode is reduced, so that battery life can be increased.

Although the present invention has been described in terms of a particular embodiment as an example, the present invention is not limited to this embodiment. Alternative embodiments, examples, and modifications that would be within the scope of the invention will be obvious to those skilled in the art.

For example, the mobile communication method is OFDM in the above embodiment. However, the scope of the present invention is not limited to the embodiment using OFDM described herein, and includes all embodiments that utilize FFT to demodulate a digital signal.

What is claimed is:

1. A mobile communication terminal comprising:
   a determiner that determines whether the mobile communication terminal is in a standby mode;
   a fast Fourier transform calculator that demodulates a signal received at the mobile communication terminal; and
   a controller that controls the fast Fourier transform calculator to vary at least one of a frequency range for fast Fourier transform or a number of frequency samples used by the fast Fourier transform calculator, depending on the determination by the determiner and based on information about frequency allocation in downlink communication from a radio base station to the mobile communication terminal and notified from the radio base station, wherein
   the controller controls the fast Fourier transform calculator to limit the frequency range for fast Fourier transform to a subcarrier frequency range for a control signal of the mobile communication terminal when the mobile communication terminal in the standby mode.

2. A mobile communication terminal comprising:
   a determiner that determines whether the mobile communication terminal is in a standby mode;
   a fast Fourier transform calculator that demodulates a signal received at the mobile communication terminal; and
   a controller that controls the fast Fourier transform calculator to vary at least one of a frequency range for fast Fourier transform or a number of frequency samples used by the fast Fourier transform calculator, depending on the determination by the determiner and based on information about frequency allocation in downlink communication from a radio base station to the mobile communication terminal and notified from the radio base station, wherein
   the controller controls the fast Fourier transform calculator to limit the frequency range for fast Fourier transform to a subcarrier frequency range for a control signal of the mobile communication terminal and a frequency covering a possible Doppler frequency transition which is induced by movement of the mobile communication terminal and originated from the subcarrier frequency range when the mobile communication terminal in the standby mode.

3. A control method for a mobile communication terminal, comprising:
   determining whether the mobile communication terminal is in a standby mode;
   executing fast Fourier transform to demodulate a signal received at the mobile communication terminal; and
   varying at least one of a frequency range for the fast Fourier transform or a number of frequency samples used by the fast Fourier transform, depending on the determining and based on information about frequency allocation in downlink communication from a radio base station to the mobile communication terminal and notified from the radio base station, wherein
   the varying includes limiting the frequency range for fast Fourier transform to a subcarrier frequency range for a control signal of the mobile communication terminal when the mobile communication terminal in the standby mode.

4. A control method for a mobile communication terminal, comprising:
   determining whether or not the mobile communication terminal is in a standby mode;
   executing fast Fourier transform to demodulate a signal which is received at the mobile communication terminal; and
   varying at least one of a frequency range for the fast Fourier transform or a number of frequency samples used by the fast Fourier transform, depending on the determining and based on information about frequency allocation in downlink communication from a radio base station to the mobile communication terminal and notified from the radio base station, wherein
   the varying includes limiting the frequency range for fast Fourier transform to a subcarrier frequency range for a control signal of the mobile communication terminal and a frequency range covering a possible Doppler frequency transition which is induced by movement of the mobile communication terminal and originated from the subcarrier frequency range when the mobile communication terminal in the standby mode.

* * * * *